Figure 18:
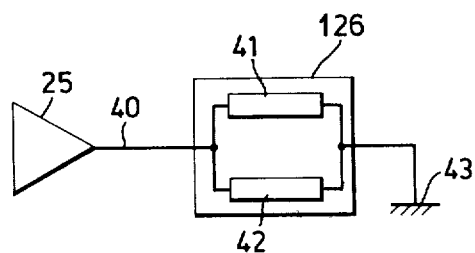

United States Patent [19]

Henoch et al.

[11] 4,242,661

[45] Dec. 30, 1980

[54] DEVICE FOR REGISTRATION OF OBJECTS

[75] Inventors: Bengt T. Henoch, Skarholmen; Eilert Berglind, Bandhagen, both of Sweden

[73] Assignee: Stifelsen Institutet for Mikrovagsteknik Vid Tekniska Hogskolan i Stockholm, Stockholm, Sweden

[21] Appl. No.: 667,306

[22] Filed: Mar. 16, 1976

[30] Foreign Application Priority Data

Mar. 27, 1975 [SE] Sweden .............................. 7503620
Jan. 12, 1976 [SE] Sweden .............................. 7600204

[51] Int. Cl.³ .................. G08G 1/00; G01S 13/74; H03C 3/00
[52] U.S. Cl. ................................ 340/23; 332/23 R; 343/6.5 SS
[58] Field of Search ............... 340/23, 24, 32, 33, 340/408, 505; 343/6.5 SS, 6.5 R, 17.5, 112 TC, 112 PT, 6.5 LC, 7.6, 18 B, 18 C, 18 D, 6.8 R; 332/16 R, 23 R; 455/99, 89, 313

[56] References Cited

U.S. PATENT DOCUMENTS

| | | |
|---|---|---|
| 2,193,102 | 3/1940 | Koch . |
| 2,602,160 | 7/1952 | Wilkins ........................... 343/6.5 R |
| 2,774,060 | 12/1956 | Thompson . |
| 3,025,516 | 3/1962 | Bickler ........................... 343/6.5 R |
| 3,206,746 | 9/1965 | Beyersdorf et al. ........... 343/6.5 SS |
| 3,480,951 | 11/1969 | Freedman ......................... 343/6.8 |
| 3,480,952 | 11/1969 | Freedman ......................... 343/6.8 |
| 3,500,399 | 3/1970 | Norris ............................. 332/16 R |
| 3,631,484 | 12/1971 | Augenblick ..................... 343/6.5 R |
| 3,699,479 | 10/1972 | Thompson et al. ............. 332/16 R |
| 3,718,899 | 2/1973 | Rollins ............................... 340/23 |
| 3,839,717 | 10/1974 | Paul .............................. 343/6.5 LC |
| 3,859,624 | 1/1975 | Kriofsky et al. ............... 343/6.5 R |
| 3,914,762 | 10/1975 | Klensch ........................ 343/6.5 SS |
| 3,984,835 | 10/1976 | Kaplan et al. ................. 343/6.5 SS |
| 4,019,181 | 4/1977 | Olsson et al. ................. 343/6.5 SS |
| 4,798,641 | 3/1974 | Preti ............................. 343/6.5 SS |

FOREIGN PATENT DOCUMENTS

| | | |
|---|---|---|
| 819566 | 9/1951 | Fed. Rep. of Germany . |
| 969289 | 5/1958 | Fed. Rep. of Germany . |
| 1295424 | 1/1970 | Fed. Rep. of Germany . |
| 1566716 | 12/1973 | Fed. Rep. of Germany . |
| 346388 | of 0000 | Switzerland . |
| 380220 | 11/1975 | Switzerland . |
| 776259 | 6/1957 | United Kingdom . |
| 776797 | 6/1957 | United Kingdom . |
| 987868 | 3/1965 | United Kingdom . |
| 1130050 | 10/1968 | United Kingdom . |
| 1168509 | 10/1969 | United Kingdom . |
| 1187130 | 4/1970 | United Kingdom . |

OTHER PUBLICATIONS

IEEE Transactions, Henoch et al., vol. MTTT-19, No. 1, Jan. 1971.
Flygvapnet, Osterberg, 1963.
Proceedings of IEEE, Koelle et al., pp. 1260-1261, Aug. 1975.
"Electronic Animal . . . Monitoring", Bladwin et al., 1973.
IRE Transactions, Rutz, pp. 158-161, Mar. 1961.
Reports on Research, Sep.-Oct. 1977, vol. 5, No. 2.
IRE Transactions, Harrington, pp. 165-174, May 1962.
Proceedings of IRE, Mar. 1961, pp. 634-635.
Electronic Letters, Dec. 1975, vol. 11, pp. 642-643.
"Electronic Identification . . . Monitoring", Koelle et al., 7-73 to 6-74, pp. 1-5.
RCA Review, vol. 34, 12-73, Klensch et al., pp. 566-579.
RCA Review, Sterzer, 6-74, vol. 35, pp. 167-175.
IEEE Transactions, Jaffe et al., pp. 371-378, May, 1965.

*Primary Examiner*—John W. Caldwell, Sr.
*Assistant Examiner*—James J. Groody
*Attorney, Agent, or Firm*—Leblanc, Nolan, Shur & Nies

[57] ABSTRACT

Devices for registration of an object and its movements in relation to another object by means of a high frequency signal transmitted from one of the objects and reflected from the other object, the reflected signal being modulated with an identification code and received back at the first mentioned object where the registration of the code takes place. To separate the reflected signal, from the first transmitted signal the frequency of the reflected signal is changed at the same time as it is reflected, the frequency change of the reflected signal being made in a way which allows the frequency of the reflected signal to be chosen according to wish, and that the frequency of the reflected signal is not equal to any of the stronger harmonic of the fundamental frequency of the first, originally transmitted signal. Thereby the reflected signal can be properly received and detected even though much weaker than the transmitted signal or any of its harmonics.

31 Claims, 22 Drawing Figures

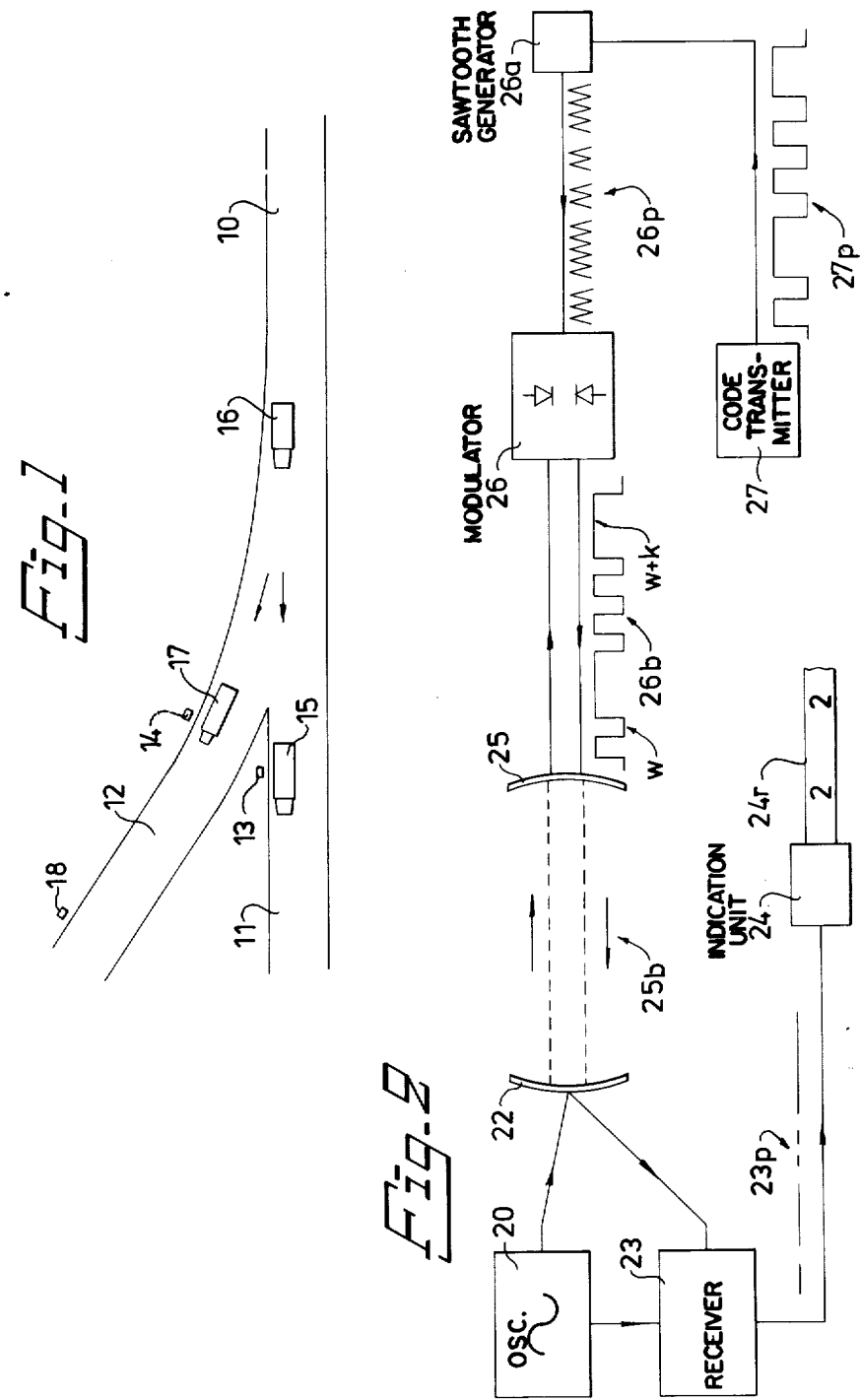

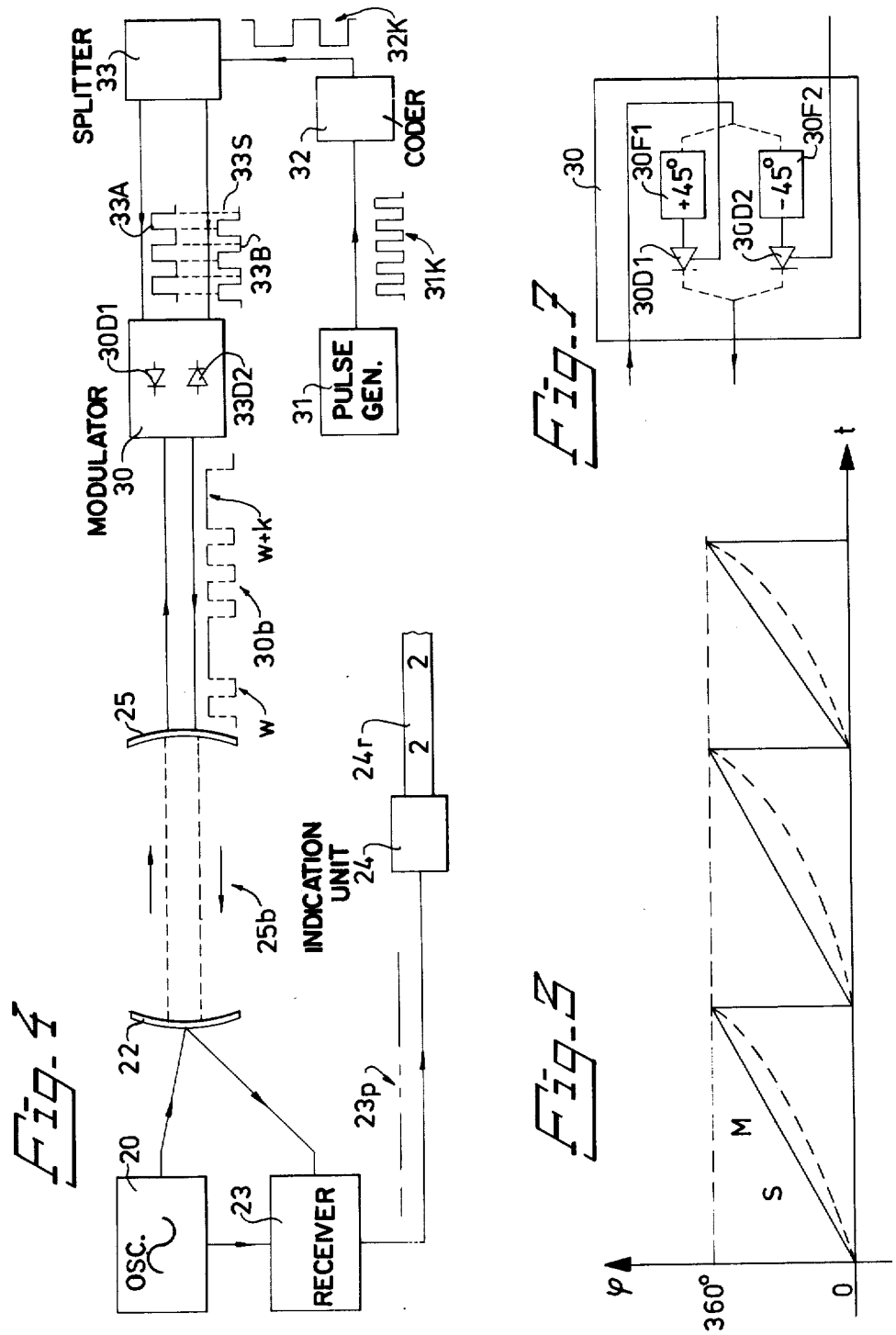

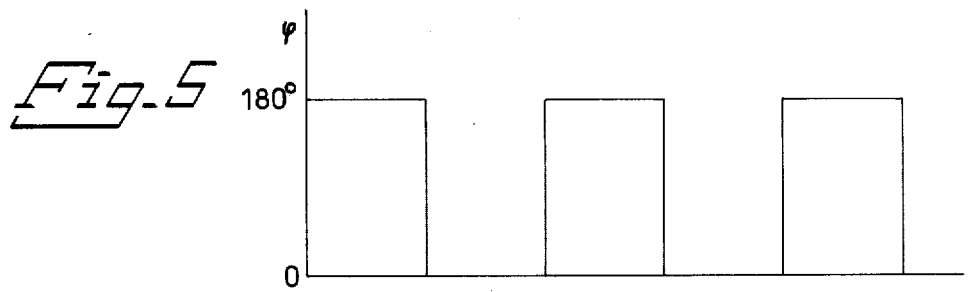
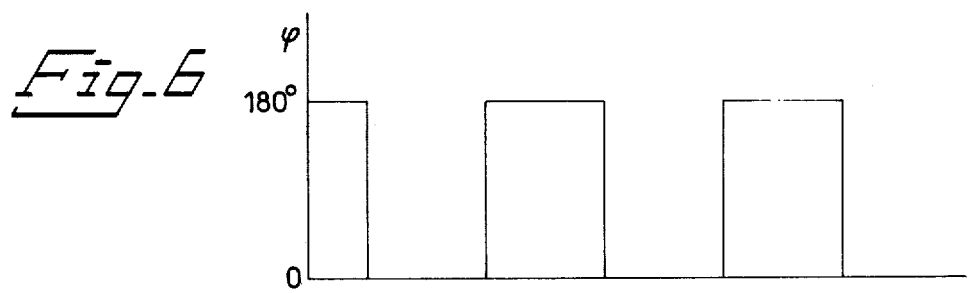
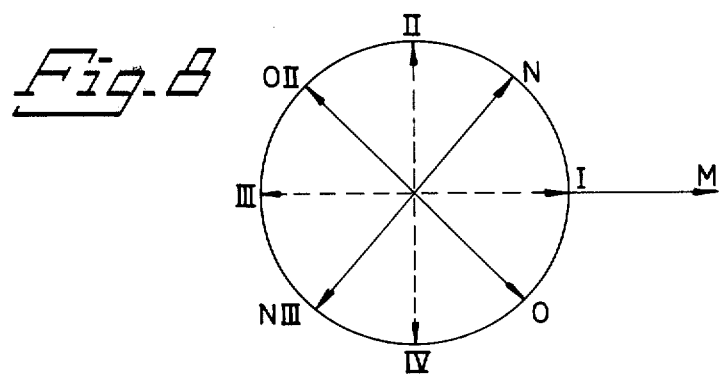
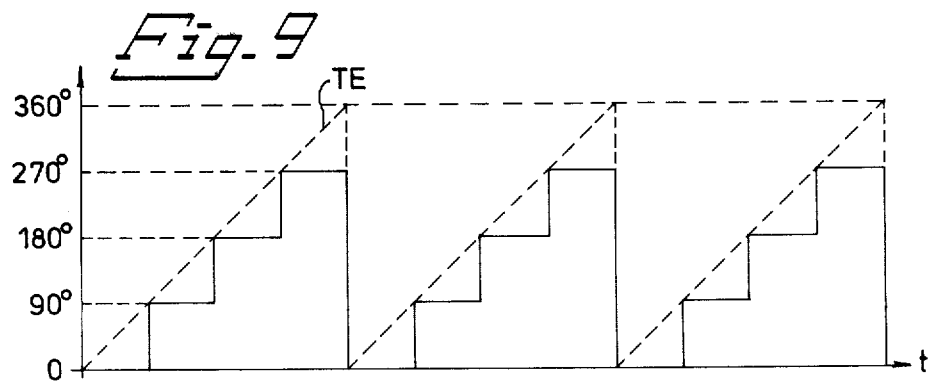

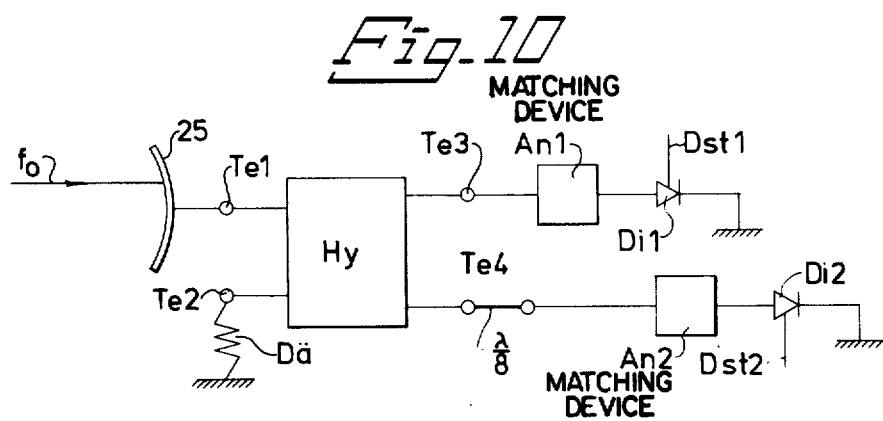
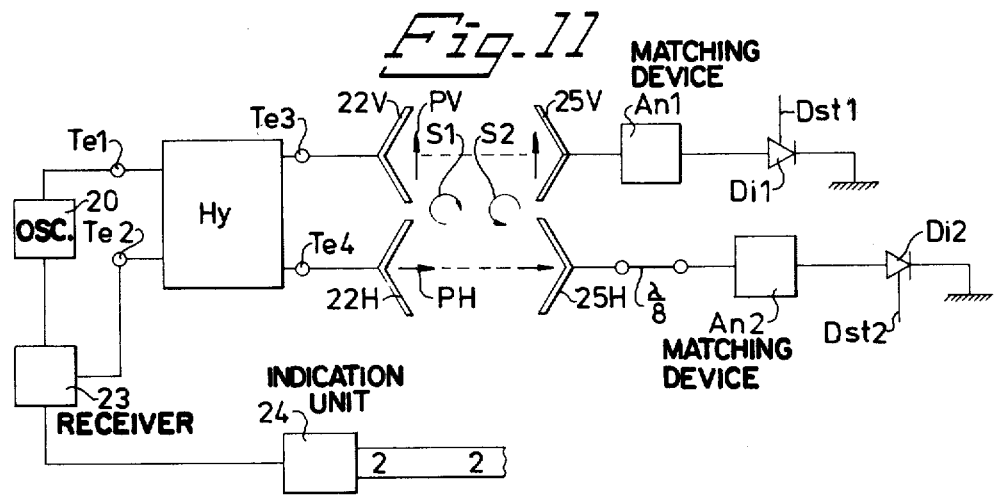

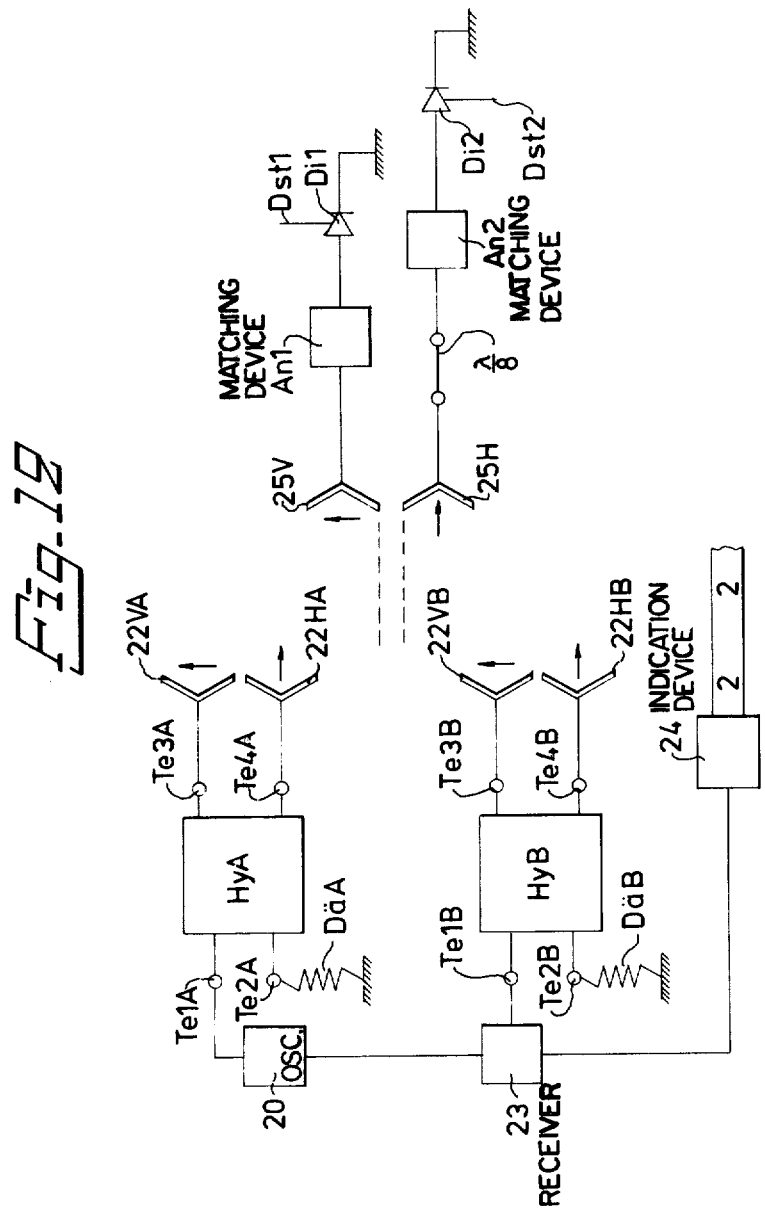

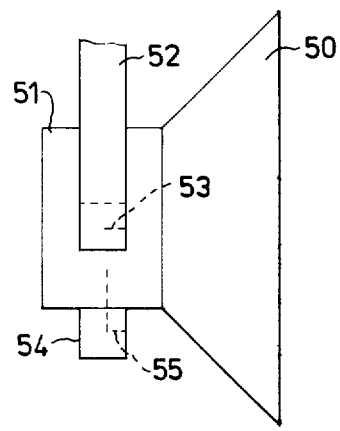
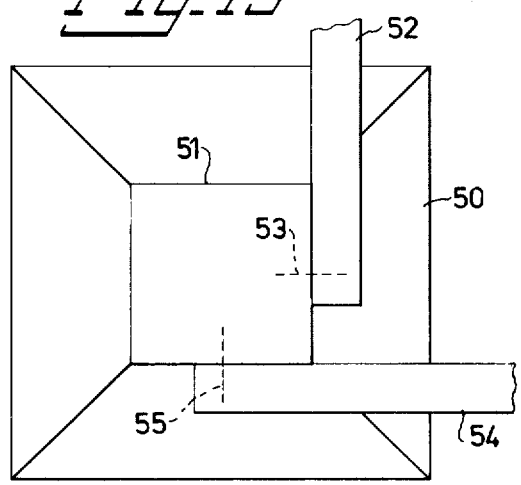
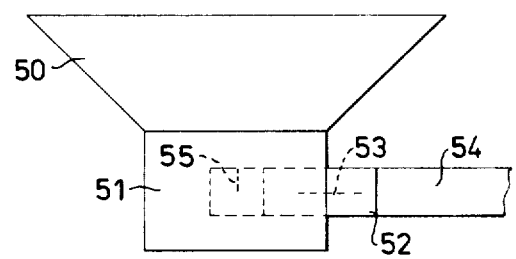
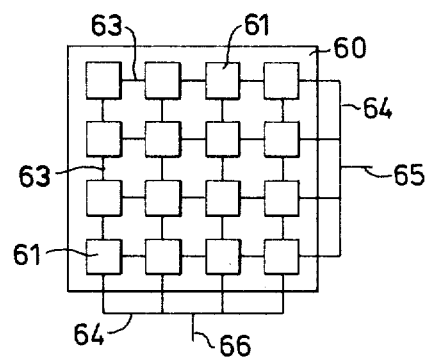

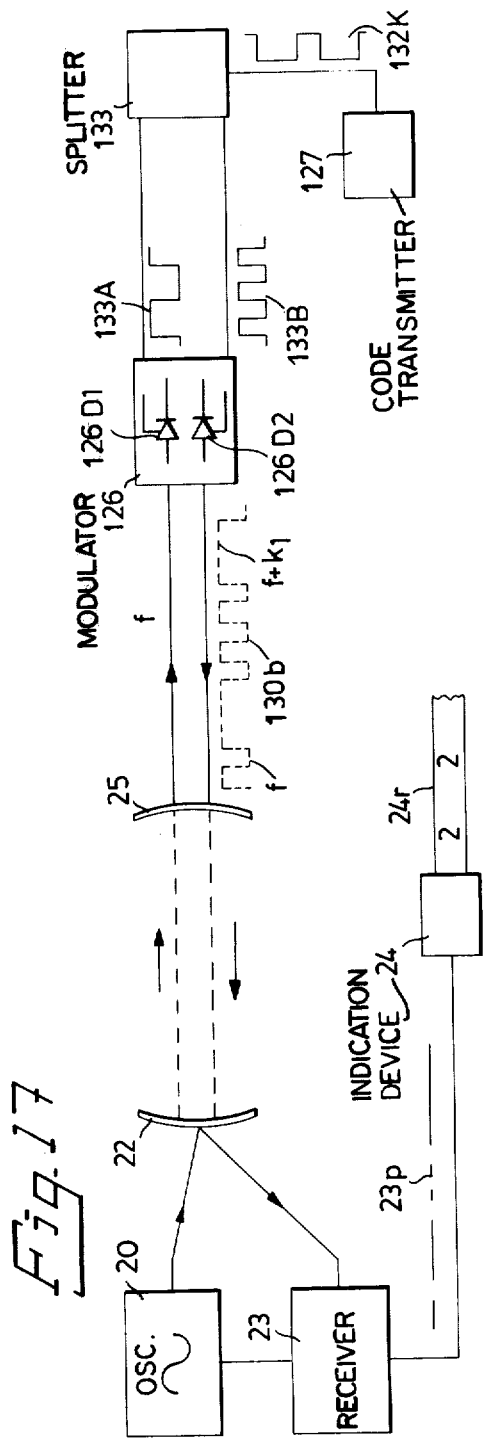

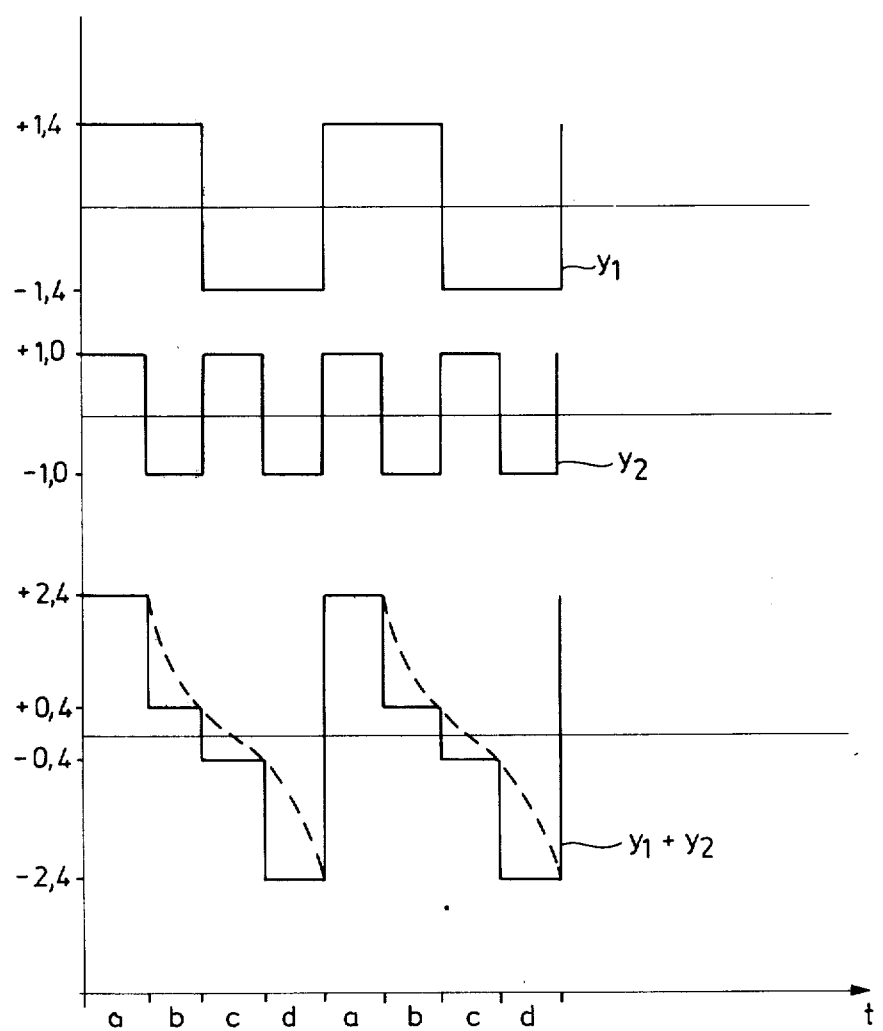

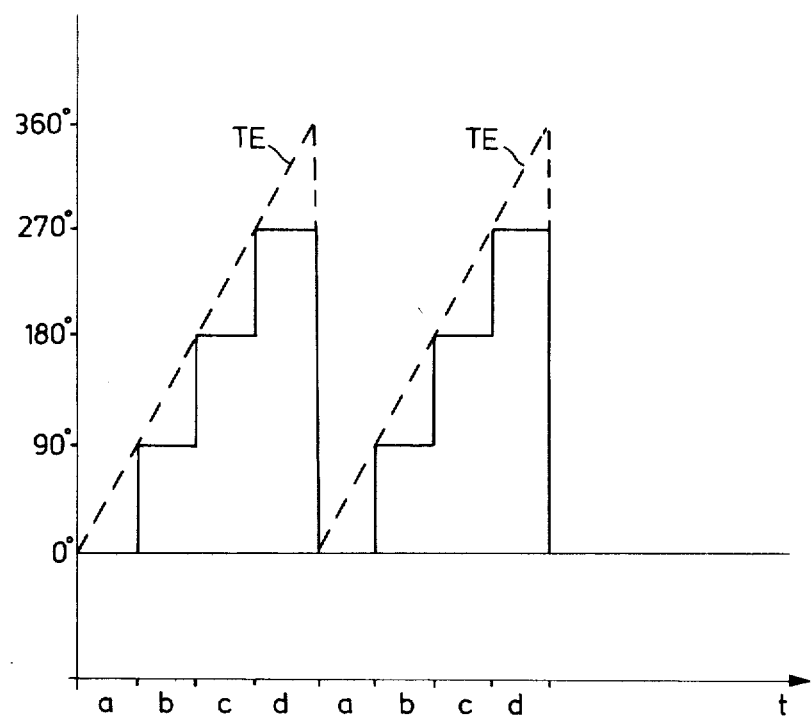

DEVICE FOR REGISTRATION OF OBJECTS

This invention relates to a device for the registration of objects, and more precisely for the registration and identification of objects, which have been provided with registration transmitters containing an electronic code. The object of the invention is to provide a device, which is easy to manufacture and to handle, and by means of which it is possible in a simpler way, for example, to chart and channel the motorcar traffic in densely built-up areas.

A registration device of this kind is already known from our Swedish Pat. No. 346 388. At this known device, a stationary recording unit is mounted in a place where registration is to take place. The recording unit comprises a transmitter tuned to a certain frequency, and a receiver tuned to a frequency differing from the transmitter frequency, which receiver comprises a detector. On each object to be registered, besides, a registration transmitter is provided which comprise a receiver for receiving the signal emitted from the transmitter of the recording unit, and a means for converting this signal to a signal with said frequency value differing from the transmitter frequency and modulating said converted signal with a code characteristic of the object and reemitting the modulated signal to the recording unit where it is received and detected by the receiver of the recording unit. At the known device the frequency conversion takes place by frequency multiplication, and the converted signal, therefore, has a frequency which is a multiple of and at least twice as high as the signal emitted from the transmitter. The said device has certain disadvantages, which according to the present invention are avoided. Said disadvantages a.o. are as follows.

1. Due to the great difference is frequency between outgoing and ingoing signals, separate aerials must be provided.
2. The signal emitted from the transmitter in the recording unit normally has relatively strong overtones, one of which has a frequency coinciding with the frequency of the relatively weak signal received from the registration transmitter. The lastmentioned signal, therefore, is difficult to distinguish from said overtone. The registration, therefore, is unsafe.
3. The frequency multiplication in the registration transmitters implies necessarily a substantial energy loss, so that the reemitted signal normally is much weaker than the signal received by the registration transmitters. Owing thereto, and to the circumstance mentioned in item 2., registration with safety can take place only when the distance between the recording unit and a registration transmitter is relatively small, which in this case implies at maximum up to 10 to 15 meters.
4. The frequency multiplicator with associated filter circuits and other necessary equipment is relatively expensive, and each registration transmitter, therefore, represents a relatively large expenditure. This is of great importance, because the registration transmitters mostly are provided in a great number.

The present invention provides a device for the registration of objects at which the aforesaid disadvantages have been eliminated entirely or partially and which shows other advantages over the known state of art.

The invention relates to a device for the registration of objects wherein the frequency converter in the above mentioned registration transmitter is characterized by comprising a modulator which modulates the received signal in such a manner that at least one sideband or side frequency is formed for transmission back to the recording unit. In the registration transmitter or transceiver of this invention a coding device provides the thusly produced side frequency with a code individual to the registration transmitter, preferably by starting and stopping the modulator in accordance with a pattern constituting the code.

The following descriptive part deals with an embodiment of the invention, at which the recording units are assumed be stationary mounted in certain fixed places, and the registration transmitters are assumed be mounted on mobile objects, which at certain occasions stay at or move past said fixed places. The invention, however, is as well adapted to be used in reverse order, in which case the recording units should be mounted on mobile objects, and the registration transmitters be provided in certain selected fixed places. The invention, finally, can, of course, be applied in such cases when the registration of movements of different mobile objects relative to each other is required, in which case the recording units can be mounted on some of these objects and the registration transmitters on other such objects. The invention is not restricted to a definite field of such applications.

Figure 19:
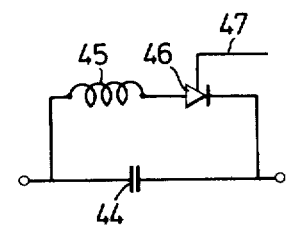
Figure 21:
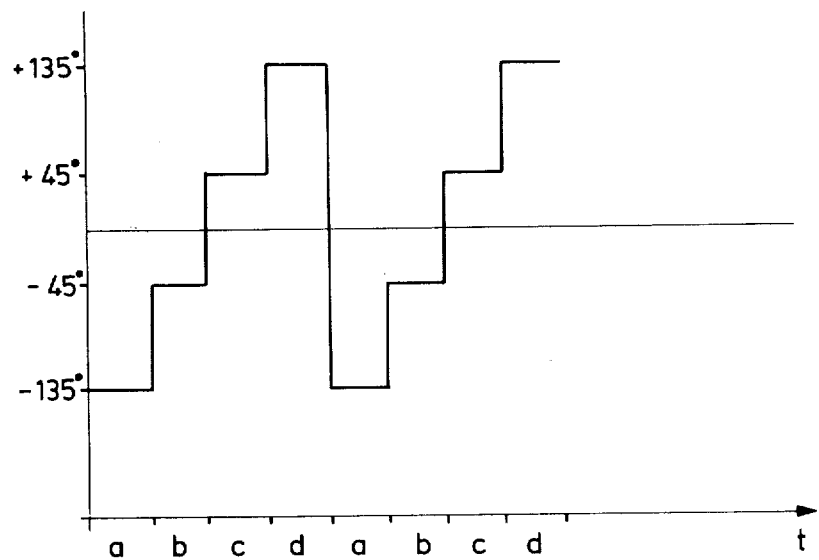

The invention is described in the following with reference to the accompanying drawings, in which FIG. 1 shows a road section, FIG. 2 is a block diagram of a device according to a first embodiment of the invention, FIG. 3 is a curve representing a periodic phase change of a voltage produced in a saw-tooth generator comprised in the device, FIG. 4 is a block diagram of a second embodiment according to the invention, FIGS. 5 and 6 each show a pulse train used for phase modulation, FIG. 7 shows in greater detail one of the components comprised in the device according to FIG. 4, FIG. 8 is a diagram illustrating a phase modulation and its formation, FIG. 9 shows a series of staircase curves, according to which phase modulation takes place, FIG. 10 is a block diagram of a registration transmitter according to a third embodiment of the invention, FIG. 11 is a block diagram of an entire installation according to a fourth embodiment of the invention, FIG. 12 is a block diagram of an installation according to a fifth embodiment, FIGS. 13, 14 and 15 show a waveguide funnel used in connection with the invention, seen from different sides, FIG. 16 shows an aerial of a different design intended to be used instead of the aerial according to FIGS. 13, 14, 15, FIG. 17 is a block diagram intended to facilitate the explanation of the mode of operation of a sixth embodiment of the invention, FIG. 18 shows a detail of the device according to FIG. 17, FIG. 19 shows more explicitly a detail comprised in FIG. 18, FIG. 20 shows a number of curves for explaining the mode of operation of the invention according to the sixth embodiment, FIG. 21 shows a curve derived from FIG. 20, FIG. 22 shows a curve derived from FIG. 20.

The utilization of the invention for registration, identification, debiting and speed control is indicated in FIG. 1, which shows a section of a road with a main road 10 dividing into two separate roads 11 and 12. In the place where the roads 11 and 12 begin, a recording unit 13 and 14, respectively, are positioned for each road and intended to co-operate with registration transmitters 13 and 14, respectively, provided on cars, of which three are shown and designated by 15, 16, 17. Said registration transmitters, as will be described in detail below, are designed so as to have a code characteristic for the respective unit, which code when a car passes a recording unit is recognized by the unit and registered for future use for statistic, debiting or similar purposes. By co-operation between two recording units, for example the unit 14 and a further recording unit 18 on the road 12, an effective check of the speed of the passing car can be carried out. With present technology it is possible in a simple way to arrange individual codes for a very large number of cars and, when registrations corresponding to these codes have been collected, to process these registrations and make them available for different purposes.

A first embodiment of the invention is described below, with reference to FIGS. 2-3.

The device according to FIG. 2 comprises a recording unit 20-24 and a registration transmitter 25-27. The recording unit includes an oscillator 20, which is capable to emit a high-frequency electric signal of fixed frequency, for example 10 GHz, an aerial 22 for transmitting said signal, which aerial 22 also can be adapted to receive a registration signal depending on said transmitted signal, a receiver 23 tuned selectively to the frequency of the registration signal which is different from the frequency of the transmitted signal, and an indication unit 24 for indicating a code included in the registration signal. The registration transmitter includes an aerial 25 for receiving the signal transmitted from the recording unit and for transmission of the registration signal, a frequency changer 26 adapted to emit the registration signal, a code transmitter 27 adapted to emit a pulse train characteristic for the registration transmitter in question, which pulse train is utilized for modulation of the registration signal, and a generator 26a for a saw-tooth voltage.

The high-frequency signal transmitted from the aerial 22, thus, is received in the aerial 25 of the registration transmitter and conducted to the frequency changer 26, which comprises a phase modulator producing a side band to the signal received, which is re-transmitted from the aerial 25 (or possibly a separate aerial) as registration signal. Due to the fact that the registration signal has a frequency different from the received signal, it is possible at the recording unit effectively to separate the registration signal from irrelevant reflections from the surroundings. The pulse train emitted by the code transmitter 27 has pulses of different lengths and/or different time intervals. The pulse train is characteristic for the registration transmitter. The pulse train is formed by a programmed memory which, thus, can be said to contain a code characteristic for the registration transmitter.

The pulse train which, for example, may have the appearance shown at 27p in FIG. 2 is fed in to a saw-tooth generator 26a, which is designed so as to be actuated by each pulse and continues to emit a voltage of saw-tooth shape for the duration of the pulse and is taken out of action in the intervals between the pulses.

The saw-tooth generator then emits a pulse train having about the appearance as shown in the drawing and designated by 26p. These pulses are supplied to a phase modulator 26, which preferably is a so-called single side band modulator and may be so constructed as disclosed in "IEE Transactions on Microwave Theory and Techniques" vol. MTT-19, No. 1, January 1971, pages 103-105, in an article with the headline "A 360° Reflection-Type Diode Phase Modulator".

FIG. 3 illustrates in a time diagram with enlarged time scale the appearance of a narrow portion of the saw-tooth pulses supplied to the modulator 26 and the phase-turning effect of the pulses on the carrier wave, which is supplied from the aerial 25 to the modulator 26 and after said phase-modulation is reflected back to the aerial 26 and transmitted therefrom.

For each saw-tooth pulse generated by the saw-tooth generator 26a the voltage is assumed to increase linearly according to the curve S in FIG. 3 to such a value, that the phase angle of the carrier wave reflected by the modulator 26 is changed from zero to 360°. This is illustrated in FIG. 3 where the vertical axis is assumed to represent the phase-turning of the carrier wave caused by the saw-tooth pulses. The fact that said phase-turning takes place implies, that the frequency of the carrier wave is changed. The frequency of the unmodulated carrier wave being assumed be f, the instantaneous voltage of the carrier wave is $$e = E \sin 2\pi ft,$$

where E is the amplitude of the voltage.

During each saw-tooth pulse the phase angle of the carrier wave is changed 360°, i.e. the frequency is changed during the duration of the saw-tooth pulse so much as corresponds to a complete cycle of the original frequency. This frequency change can be called a positive or negative contribution k to the original frequency w.

The instantaneous voltage of the carrier wave reflected from the modulator 26, thus, will be $$e_r = E \sin 2\pi (f+k)t \text{ or}$$

$$e_r = E \sin 2\pi (f-k)t$$

As the phase turning covers 360° and the phase turning procedures take place immediately subsequently to each other, without interruption, the frequency of the reflected wave will be $f+k$ or $f-k$ during the whole duration of a pulse train of saw-tooth pulses. k may be positive or negative, depending on the polarity of the modulation voltage.

When the phase modulator 26 does not operate rectilinear, i.e. when the instantaneous phase turning brought about is not a linear function of the modulation voltage applied, the curve shape of the latter must differ from the usual saw-tooth shape, because otherwise the magnitude k will not be constant. When, as stated in said article in IEE, the curve representing the phase-turning as a function of the modulation voltage is lightly upward convex (the first derivative decreasing), the arrangement can be made that each pulse in the saw-tooth shaped modulation voltage has a forward edge, which is upward concave in a corresponding degree, as illustrated in FIG. 3, dashed curve M.

The signal reflected from the modulator 26 will have the appearance shown at 26b. It consists of two frequencies alternating with each other. One of these frequencies is equal to the frequency of the signal generated by the transmitter 20 and transmitted by the aerial 22. The signal has this frequency in the intervals between the pulses. The second frequency is equal to f+k or f−k, and the signal has this frequency during the duration of each pulse. The signal 26b has the same code pattern as the pulse train 27p and, thus, is characteristic for the registration transmitter in question. The signal 26b is transmitted by the aerial 25 and conducted to the aerial 22 in the form of a varying carrier wave 25b.

The receiver 23 is tuned to said frequency f+k or f−k and, therefore, will receive only the pulses of the carrier wave 25b. The detected pulses are passed in the form of a pulse train 23p from the receiver 25 to an indication means 24, which may be a detector known per se. Said indication means may be designed so as in a window or the like to show a figure corresponding to the pulse train 27p and identifying the object, which is provided with the registration transmitter in question. Said means 24 may also comprise a recorder, which records said figure or another identification sign on a tape 24r being advanced.

The modulation voltage required for modulation of the signal in the modulator 26 can also be generated in a way other than by a generator for saw-tooth voltages.

A second embodiment of the invention is described in the following with reference to the FIGS. 4–9.

It is possible, for example, to use two phase-turning means, which also may be of the same kind as stated in the article in IEE referred to above, but which alternatively may be of a simpler design, because none of them must rotate the phase angle through 360°, but only through a part thereof. Each such phase turning means can comprise at least one capacitance diode, each of which is fed with a train of modulation pulses in the form of clock pulses from a generator generating clock pulses. The two trains of clock pulses are dephased by half a pulse width relative to one another. For each passing pulse edge the phase angle of the carrier wave being modulated is shifted by 180°.

The device is illustrated schematically in the FIGS. 4 to 9. In FIG. 4, which corresponds to FIG. 2 of the aforedescribed first embodiment, the emitter 20 and the receiver 23 are shown which are connected to the common aerial 22. These means are associated with the recording unit. There is also shown the aerial 25 of the registration transmitter which receives the carrier wave from the emitter 20 and retransmits it to the receiver 23 in a converted and coded form.

The carrier wave received by the aerial 25 is supplied to a modulator 30, which may consist of two such units which form the modulator 26 in the aforedescribed embodiment, but which alternatively can consist of two somewhat simplified modulator units, each of which is adapted to effect a maximum phase-turning of 180°. This modulator 30 is shown in a schematic manner on an enlarged scale in FIG. 7. The modulator comprises at least two capacitance diodes 30D1 and 30D2. The diode 30D1 is adapted to co-operate with a stationary phase shifting circuit 30F1, which is arranged so that a carrier wave received and reflected by the device is subjected to an initial phase shifting of +45°. In FIG. 8 which illustrates a phase indicator diagram, the received carrier wave is assumed to have the phase angle 0° and is represented by the arrow M. The carrier wave retransmitted from the device with the diode 30D1 and phase shifting circuit 30F1 has been subjected to a phase shifting of +45° when the diode 30D1 is not supplied with any modulation control voltage. This carrier wave is represented by the arrow N. The carrier wave retransmitted from the device with the diode 30D2 and phase shifting circuit 30F2 has been subjected to a phase shifting of −45° when the diode 30D2 is not supplied with any modulation control voltage. This carrier wave is represented by the arrow O.

The resultant of these carrier waves is represented by the arrow I and constitutes the carrier wave which is retransmitted by the registration transmitter when no modulation voltage is supplied to any of the diodes.

The registration transmitter comprises a generator 31 for clock pulses adapted to generate a train of densely arranged pulses 31k. These pulses are supplied to a coding device 32, which cuts off and allows the pulse train to pass according to a code characteristic for the registration transmitter. The envelope for a pulse train so coded is illustrated at 32k on a time scale which is much smaller than applied to the pulse train 31k, i.e. each "pulse" in 32k contains a plurality of clock pulses of the kind shown at 31k.

In a device 33 the coded pulse train is divided into two mutually identical pulse trains, designated 33A and 33B. The clock pulses, however, of which each such pulse train is composed, are at the pulse train A phase-shifted by 180° after the clock pulses in the second pulse train B. This is illustrated by the dashed lines 33S between the two pulse trains. The pulse trains 33A and 33B are shown on the same time scale as the pulse train 31k, and the pulses shown in these pulse trains contain only a portion of a "pulse" in the envelope shown at 32k.

The pulse train 33A is supplied as modulation voltage to the diode 30D1 in the modulator 30, and the pulse train 33B is supplied as modulation voltage to the diode 30D2 in the same modulator. Each pulse in the pulse trains 33A and 33B represents a modulation voltage of such a size, that upon its application to the diode 30D1 and 30D2, respectively, the phase angle of the carrier wave retransmitted from the diode in question is switched 180°. This implies that the resulting carrier wave retransmitted from the modulator 30 has been phase-shifted by 90°. This fact appears most clearly from FIG. 8. When the phase indicator O is shifted 180° from the position shown in this Figure, it will assume the position OII in the second quadrant. The resultant of N and OII then will be a signal with the phase position II.

After half a pulse length a voltage from the pulse train 33A will be applied to the diode 30D1 and give rise to a corresponding phase-shifting of the carrier wave represented by the phase indicator N in FIG. 8. This phase indicator then will assume the position designated by NIII in the third quadrant. The resulting carrier wave now will have the phase position represented by the arrow III. After a further half pulse length of the pulse train 33B the modulation voltage on the diode 30D2 again will be zero, and the carrier wave represented by the arrow O will again assume its original phase position in the fourth quadrant in FIG. 8. The resultant then receives the phase position represented by the arrow IV. After a further time interval of half a pulse length in the pulse train 33A the modulation voltage on the diode 33D1 will disappear, whereby also the carrier wave represented by the arrow N will reassume its original phase position in the first quadrant in FIG. 8. The resultant now again will have the phase position represented by the arrow I. During the procedure now described, thus, the phase position of the resultant carrier wave has been turned through 360°. The turning, however, has taken place according to a staircase-shaped curve where each step represents 90°. A sequence of such curves is shown in FIG. 9. Said phase turning procedure is repeated all the time during the duration of a "pulse" in the pulse train envelope designated by 32k.

When forming the envelope for the staircase-shaped pulses according to FIG. 9, a saw-tooth curve TE entirely in agreement with the curve shown in FIG. 3 is obtained. At an analysis of a carrier wave phase-modulated according to a staircase-curve according to FIG. 9 it also was found, that it includes a strong component of a frequency corresponded by the frequency $f+k_1$ where $k_1$ is equal to the repetition frequency of the saw-tooth curve formed by the envelope TE.

In FIG. 4 the carrier wave coded by the registration transmitter and retransmitted by the aerial is shown at 25b. The voltage supplied to the aerial 25 from the modulator 30 is designated by 30b. It contains the frequencies $f$ and $f+k_1$ and, besides, a number of frequencies during the modulation periods which are not shown and not received by the receiver 23 even when they are retransmitted from the aerial 25.

The registration signal 23p received and detected by the receiver 23 is passed to an indication means 24, which may be designed as a recorder providing the registration in the form of a digit on a tape 24r.

The above description of the device with reference to FIG. 7 has been carried out, for reason of easier comprehension, in such a manner, that it was understood that the signal is supplied to the modulator through one channel and conducted away through another channel. It may be pointed out here, however, that in practice it is easier to position the modulator so that its mode of operation is based on reflection.

In FIG. 10 a schematic view of a registration transmitter is shown which comprises a modulator adapted for reflection according to a third embodiment of the invention. The numeral 25 in FIG. 10 designates an aerial for receiving a signal with the frequency $f_o$ emitted from the transmitters in the recording unit. The aerial 25 is connected to one of the terminals Te1 of a so-called 3 dB hybrid Hy. A second terminal Te2 of this hybrid is earth-returned via an attenuation means Dä. One, Te3, of its two remaining terminals is connected to earth via a matching An1 and a varactor diode Di1. The second one of these terminals. Te4, is connected to earth via a matching An2 and a varactor diode Di2, but in the connection between the terminal Te4 and the matching An2 a delay line $\lambda/8$ is inserted and adapted to subject a passing signal to a phase-shifting of 45°.

Each of the diodes Di1 and Di2 has a tap for control voltage, Dst1 and Dst2, respectively. To each of these control voltage taps one of the pulse trains shown in FIGS. 5 and 6 is led.

The signal coming from the aerial 25 is divided by the hybrid Hy into two components, each with half the effect of the signal fedin, and the hybrid is of such a nature, that its two components are discharged on the terminals Te3 and Te4 with mutually different phase angles of 90°. The signal from the terminal Te3 passes through the matching An1 and is reflected in the diode Di1 with a certain phase angle assumed to be $\psi$ or $\psi+180°$ depending on whether or not a control voltage is applied on the diode Di1 (and where $\psi$ can be zero).

The signal coming from the terminal Te4 is phase turned through 45° in the delay line $\lambda/8$ and passes the matching An2 and is reflected in the diode Di2 with a corresponding phase angle $\psi$ or $\psi+180°$ depending on whether or not a control voltage is applied to the diode Di2. After the reflection, the signal originating from Te3 again appears on Te3, but now with a phase angle $\chi$ or $\chi+180$ where $\chi$ can be equal to $\psi$ or differ from this value, depending on whether or not some phase shifting occurs in An1. In a corresponding way, the signal originating from Te4 after the reflection will again appear on Te4, but now with a phase angle of $\chi+45°+45°$ or $\chi+45°+45°+180°$, because the signal is phase shifted 45° in the delay line $\lambda/8$ also on the return way.

When to the diodes Di1 and Di2 control voltages are applied each in the form of a pulse train phase-shifted in relation to each other according to FIGS. 5 and 6, a phase rotation occurs of the vectorial total of the reflected signals of the kind described above with reference to FIGS. 8 ad 9. On each terminal Te1 and Te2, due to the conditions described with reference to FIG. 9, a side band will be discharged, i.e. on one terminal the difference side band with the frequency $f-k$ and on the other terminal the total side band with the frequency $f+k$, where k is an expression for the repitition frequency of the modulation signal. (k is, in fact, also an expression for the steepness of the envelope TE in FIG. 9).

The side band discharged on the terminal Te2 is conducted away to earth through the attenuation means Dä with suitable impedance. The side band discharged on the terminal Te1 is returned to the aerial 25, from which it was transmitted to the receiver in the recording unit.

Alternatively, the side band discharged on the terminal Te1 can be attenuated by an attenuation set and a frequency selective filter and, instead, the side band discharged on the terminal Te2 be utilized. In this case, however, a separate aerial is to be provided for retransmitting the side band, to which the terminal Te2 is connected.

This, however, can have certain disadvantages as will be apparent from the following.

In FIG. 11 a variant of a registration device according to a fourth embodiment of the invention is shown. At this variant, as at the device according to FIG. 2, the numeral 20 designates an emitter included in the recording unit, and the numeral 23 designates a receiver with indication unit 24. Also at the device according to FIG. 11 a 3 dB-hybrid Hy is provided which, however, different from the device according to FIG. 10, is positioned in the recording unit instead of in the registration transmitter. From the emitter 20 the signal with the frequency $f_o$ is conducted directly to the terminal Te1 of the hybrid Hy. The signal then is discharged on the terminals Te3 and Te4 with half of the energy on each terminal. The terminals Te3 and Te4 are shown connected each to an aerial 22V, which is adapted to emit with vertical polarization (marked by the arrow PV), and 22H, which is adapted to emit with horizontal polarization (marked by the arrow PH). The hybrid Hy is of such nature that the signal discharged on the terminal Te4 is phase-shifted 90° in relation to the signal discharged on the terminal Te3. By this arrangement, a carrier wave with circular polarization will be emitted from the two aerials. The carrier wave thus emitted is received at the registration transmitter by two aerials polarized in a corresponding way and designated by 25V and 25H, respectively. From the aerial 25V the received signal component is conducted to a matching An1 and to a varactor diode Di1, which corresponds to the means with the same designations in FIG. 10.

From the aerial 25H the received signal is conducted in a corresponding way through a delay line λ/8 and through a matching An2 to a varactor diode Di2, which means correspond to the means with the same designations in FIG. 10. As in the case of the device according to FIG. 10, the control voltage inputs Dst1 and Dst2, respectively, of the two diodes are supplied with control voltages each according to one of the pulse trains according to FIGS. 5 and 6, and thereby the reflected signal will be modulated so that two side bands are produced. These side bands are retransmitted by the two aerials 25V and 25H of circular polarization with different rotation direction, as illustrated by the arrows S1 and S2 in FIG. 11. One of these side bands will appear on the terminal Te1 of the hybrid Hy, and the other side band on the terminal Te2.

At the device according to FIG. 11 the side band appearing on the terminal Te2 is utilized and conducted to a receiver 24. This is to prefer, because of the terminal Te1 where the other side band appears, is applied also the much stronger signal from the emitter 20. It requires much more efficient filters for utilizing the side band from this terminal. Together with the side band on the terminal Te2, however, a relatively strong background noise arises, which originates from reflections or the like, so that also here frequency selective filters are required for utilizing the side band.

A signal is supplied through a line directly from the emitter 20 to the receiver 23 in order to detect the modulation signal having given rise to the side band.

At the device according to FIG. 11, an extra selectivity is obtained by polarization in addition to the selectivity, which frequency selective filters can provide, because the side bands S1 and S2 have circular polarization with different rotation directions, and the aerial system 22V, 22H is sensitive substantially only for circular polarized waves with one of these rotation directions. Both the aerial system 25V, 25H and the aerial system 22V, 22H are relatively insensitive to rotation in a plane perpendicular to the propagation direction of the waves.

In FIG. 12 a device is shown, which constitutes a fifth embodiment of the invention and at which a still better selectivity can be obtained, because the background noise is eliminated to a great extent. At this device the recording unit has two hybrids, HyA and HyB, of which the hybrid HyA is adapted to operate only for transmission, and the signal output of the transmitter 20, therefore, is connected to the terminal Te1A of this hybrid. The function at transmission is the same as described with reference to FIG. 11.

The second hybrid, HyB, operates only for receiving, and to this hybrid are connected two receiver aerials 22HB and 22VB polarized in the same way as the transmitter aerials 22HA and 22VA connected to the first mentioned hybrid HyA₁, and a receiver 23, which is coupled to the terminal Te1B and, besides, fed with a signal directly from a transmitter which, thus, acts at the receiving as local oscillator.

The advantage of the device according to FIG. 12 is, that the received signal can be tapped from the terminal Te1B where there is a minimum of background noise. The side band appearing on the terminal Te2B is conducted away by an attenuating impedance DÄB. At the devices according to FIGS. 11 and 12 the aerials can be combined in pairs so that only half the number of aerials shown in the respective Figure are required. The FIGS. 13, 14 and 15 show an aerial of waveguide type, which performs the same function as the aerials 22H and 22V in FIGS. 11 and 12. FIG. 13 shows the funnel seen from the rear side, FIG. 14 shows the same funnel seen from the upper side according to FIG. 13, and FIG. 15 shows the device seen from the right-hand side according to FIG. 13.

The aerial according to these Figures consists of a funnel-shaped portion 50 and a substantially cube-shaped portion 51 connected to the narrowest part of said funnel-shaped portion. To said cube-shaped portion 51 are connected two waveguides, viz. one waveguide 52 with a coupling loop 53 for producing waves with horizontal polarization, and one waveguide 54 with a coupling loop 55 for producing waves with vertical polarization.

FIG. 16 shows another type of aerial adapted for use for the same purpose as the waveguide funnels according to the FIGS. 13 to 15. Such an aerial comprises a relatively large mat or plate 60 of electrically non-conductive material, on which a great number of smaller plates 61 of electrically conductive material are mounted in rows and columns and interconnected both in rows and columns by conductors 63. Besides, all rows are interconnected along two sides perpendicular to each other, and all columns are interconnected by transverse conductors 64. At the centre of each such transverse conductor a recess 65 and, respectively, 66 is provided which form the input or output for a high-frequency signal transmitted or received by the aerial. The aerials according to FIG. 16 operate for carrier waves polarized in the horizontal and vertical plane.

Combination aerials can also be designed in many other known ways obvious to the expert.

In the following a sixth embodiment of the invention is described, which is a modification of the second embodiment shown in the FIGS. 4 to 9 and described in connection therewith. The modification refers particularly to a device for bringing about the phase angle change of the signal reflected from a registration transmitter as illustrated in FIGS. 8 and 9. The modified device provides a higher efficiency degree and is easier to realize than the aforedescribed device. It is, moreover, less expensive to manufacture and has a greater safety of operation.

The invention, as mentioned above, can be applied, for example, to registration, identification, debiting and speed control purposes, which application is indicated in FIG. 1.

The device according to FIG. 17 which corresponds to FIG. 2 or FIG. 4, comprises a recording unit 20-24 and a registration transmitter with a.o. an aerial 25. The recording unit 20-24 corresponds entirely to the recording units 20-24 in FIGS. 2 and 4 and, thus, includes an oscillator 20 adapted to emit a high-frequency electric signal with fixed frequency, for example 10 GHz, an aerial 22 for transmitting said signal and which also may be adapted for receiving a registration signal depending on said transmitted signal, a receiver 23 selectively tuned to the frequency of the registration signal which is different from the frequency of the transmitted signal, and an indication means 24 for indicating a code contained in the registration signal. The registration transmitter comprises an aerial 25 for receiving the signal transmitted from the recording unit and for transmitting the registration signal, a frequency changer 126 adapted to emit the registration signal, a code transmitter 127 adapted to emit a pulse train characteristic for the registration transmitter in question, which pulse train is utilized for modulating the registration signal, and a generator 133 for generating two pulse trains of different frequencies.

The frequency changer 126 corresponds to the devices 26 and 30 in FIG. 2 and FIG. 4, respectively, and, thus, is a phase modulator with the object of modulating the signal reflected from the registration transmitter and retransmitted to the recording unit so that at least one side band is formed.

At the device according to FIG. 2 the received and reflected signal is modulated with a substantially sawtooth shaped modulation voltage, the curve shape of which is shown in FIG. 3. At the device according to FIG. 4 two pulse trains are used as modulation voltage which are phase-shifted half a pulse length relative to each other, and to each of which is supplied one of the two signal components phase-shifted 45° in relation to each other, into which the received signal is divided. Each pulse in each pulse train causes a 180° shifting of the phase angle of the signal component supplied to the pulse train, whereafter the signal components treated in this way are combined to form the signal reflected from the registration transmitter to the recording unit. By this method, as explicitly described above, a reflected signal is obtained which is phase-modulated with a modulation signal consisting of substantially staircase-shaped pulses, as illustrated in FIG. 9, and the envelope of which forms a sawtooth shaped curve. In connection with the description thereof it also is stated that at such a modulation a.o. the side band is produced which would be produced at modulation with a sawtooth shaped modulation signal, the curve shape of which is similar to said envelope, as was proved by analysis of the modulated signal.

By means of the device according to this sixth embodiment a modulation similar to that illustrated in FIG. 9 can be obtained, but in a simpler way than by the aforedescribed devices. At the device shown in FIG. 17, the frequency changer 126 includes two capacitance diodes 126D1 and 126D2, each of which is comprised in a circuit which both are connected to the aerial 25. To the control voltage input of one capacitance 126D1 a pulse train 133A is conducted, and to the control voltage input of the other capacitance diode 126D2 a second pulse train 133B is conducted. The pulse train 133B has a frequency twice as high as that of pulse train 133A, and these pulse trains, besides, are so synchronized with each other that each ascending and each descending pulse edge in the pulse train 133A coincide with an ascending pulse edge in the pulse train 133B. It is understood that the synchronization of the pulse train 133A and 133B alternatively can be such that each ascending and each descending pulse edge of the pulse train 133A coincide with a descending pulse edge of the pulse train 133B.

The control voltage pulses supplied to the control voltage inputs of the capacitance diodes give rise to capacitance changes of the capcitance diodes. The amplitudes of the control voltage pulses in the two pulse trains 133A and 133B are selected in a certain way in relation to the characteristics of the diodes 126D1 and 126D2 and the values of the remaining components forming the circuits, in which said diodes are comprised, in order to achieve the desired result, which will be described in greater detail with reference to FIGS. 18 to 22. The amplitude of the pulse train 133A preferably is selected to be of equal size as the amplitude of the pulse train 133B, because then the generator 133 generating these pulse trains can be given a simpler design.

The pulse trains 133A and 133B are generated by a pulse generator 133, which is started and stopped by a coding device 127. It should in this connection be observed, that the code pulses 132$k$, which may be a sequence of long and short pulses forming said codes characteristic for the registration transmitter, are shown in FIG. 17 on a much smaller scale than the pulses in the pulse trains 133A and 133B, so that even in the shortest pulses of the type 132$k$ many pulses of the type 133A and 133B can be housed.

The changed and coded signal reflected from the registration transmitter is indicated in FIG. 17 by a pulse train 130$b$, which consists of pulses of the same appearance as the pulses in the pulse train 132$k$. Each pulse consists of a microwave signal with the frequency of f+k where f is the frequency of the received signal, and f+k is the frequency of the side band generated at the modulation. Between the pulses, the reflected signal has the frequency f, i.e. the same frequency as the first signal emitted from the oscillator 20 and aerial 22.

The mode of operation of the modulator device 126, in which the pulse trains 133A and 133B effect a phase modulation of the received signal, so that a signal with the frequency f+k is formed, is described in the following with reference to the FIGS. 18 to 22.

The function of the device is based on the changes in admittance for the signals in question, to which changes the circuits are subjected into which the capacitance diodes 126D1 and 126D2 are coupled in. These admittances are of the type $Y=G+jB$, i.e. they consist of one real and one imaginary portion. In the cases here concerned the desired function can be obtained only by changes of the magnitude B, i.e. the imaginary portion of the admittance. The circuits are so dimensioned that the magnitude G is small in relation to the magnitude B and constant to the greatest possible extent. In view thereof, the term susceptance is used in the following when the function of the device is described.

The admittance $Y=1/Z$ where Z is the corresponding impedance. In the following, all admittance and impedance values are regarded standardized whereby $z=Z/Z_o$ and $y=Y/Y_o$ where $Z_o=1/Y$ is the characteristic impedance of the line.

In FIG. 18 the aerial 25 is shown schematically which is assumed to have the form of a waveguide funnel.

The waveguide funnel 25 according to FIG. 18 is connected to the modulator 126 via a short waveguide or another suitable line 40.

The modulator 126 comprises two circuits 41 and 42 connected in parallel, each of which includes one of the diodes 126D1 and 126D2.

The circuits 41 and 42 are bipolar, and the poles remote from the waveguide 40 are connected to earth indicated at 43.

Each of the circuits 41 and 42 comprises, as already mentioned, one of the capacitance diodes 126D1 and 126D2 and, besides, a number of reactive elements and possibly also one or more resistive elements. (These resistive elements are not shown in the simplified circuit diagrams, to which reference is made in the following, and they most often consist of the unavoidable loss resistances of the reactive elements).

The loss resistances in question, however, as already mentioned, are generally small, and the circuits are so dimensioned that these loss resistances do not substantially affect the desired result.

The nature of each circuit 41 and 42 appears schematically from FIG. 19, which shows a coupling diagram for such a circuit.

The circuit shown in FIG. 19 consists of a capacitance 44 and a series circuit connected in parallel with said capacitance, which series circuit includes an inductance 45 and a capacitance diode 46 with a control voltage tap 47. The capacitance diode 46 is identical with the diodes 126D1 and 126D2, respectively, in FIG. 2.

When at a device according to FIG. 18 the aerial 25 received electromagnetic waves, these waves are reflected with a phase angle depending on the total susceptance of the circuits 41 and 42, with regard being paid to both size and phase angle.

When the susceptance of the circuit 41 is called $Y_1$, and the susceptance of the circuit 42 is called $Y_2$, the total susceptance $Y = Y_1 + Y_2$.

When now the control voltage input 47 for the capacitance diode 126D1 (FIG. 17), which corresponds to the capacitance diode 46 in FIG. 19, is supplied with control voltage in the form of a pulse train 133A (FIG. 17) with a certain frequency and at the same time the control voltage input for the capacitance diodes 126D2 (FIG. 17) is supplied with control voltage in the form of a pulse train 133B with a frequency twice as high as the pulse train 133A, four different conditions occur one after the other with respect to the total susceptances of the circuits 41 and 42. These conditions correspond to different separate phase positions of the reflected signal.

In FIG. 20 is shown on an enlarged scale a section of a curve, according to which the susceptance $Y_1$ varies in dependency of the control voltage pulses 133A supplied to the control voltage input of the capacitance diode 126D1 (FIG. 17). In the selected example it was assumed that said variation in the susceptance $Y_1$ covers a total of 2,8 measuring units for said susceptance, or from a value of $-1,4$ to a value of $+1,4$ about an abscissa axis representing the time.

In a similar way is shown on a corresponding scale a section of a curve according to which the susceptance $Y_2$ varies in dependency of the control voltage pulses 133B supplied to the control voltage input of the capacitance diode 126D2.

In this case the variation of the susceptance $Y_2$ is assumed to cover an area of 2 measuring units, or from a value of $-1$ to a value of $+1$ about an abscissa axis representing the time.

In FIG. 20, further, a curve is shown according to which the total of the susceptances $Y_1$ to $Y_2$ varies. This curve is designated $Y_1 + Y_2$.

The phase positions of the reflected signal, to which the different total susceptances illustrated by the curve $Y_1 + Y_2$ give rise, are shown in FIG. 21. It is apparent from this Figure that a total susceptance $Y_1 + Y_2 = +2,4$ results in a phase turning of $-135°$ of the reflected signal in relation to the received signal. This phase turning lasts during the time interval a plotted along a time axis t. In a corresponding way, $Y_1 + Y_2 = 0,4$ yields a phase angle of $-45°$ which lasts during the time interval b, $Y_1 + Y_2 = -0,4$ yields a phase angle of $+45°$ which lasts during the time interval c, and $Y_1 + Y_2 = -2,4$ yields a phase angle of $+135°$ which lasts during the time interval d.

In FIG. 22 a curve is shown which is identical with the curve according to FIG. 1, but where the abscissa axis has been moved down to the phase angle value $-135°$ and where the ordinate values of the curve are indicated with the moved-down abscissa axis as the point of origin.

A comparison of the curve according to FIG. 22 with the curve shown in FIG. 9 shows that these two curves are alike. In FIG. 22 the envelope for the curve is shown by dash-dotted lines and designated by TE. As the envelope TE in FIG. 9, the envelope TE in FIG. 22 forms a saw-tooth curve, and for the same reasons as stated above in connection with the FIGS. 4-9, the reflected signal will be phase-modulated and include a strong component of a frequency $f + k$ where k is equal to the repitition frequency of the saw-tooth curve formed by the envelope TE.

A comparison of FIG. 20 with FIG. 22 shows that, while the envelope TE in FIG. 22 is substantially rectilinear, the envelope of the curve $Y_1 + Y_2$ in FIG. 20 is to some extent S-shaped, with an inflection point where it intersects the abscissa axis. It constitutes in fact the curve for a tangent function over an angular range defined by the angle $+135/2$ and the angle $-135/2$. This is due to the relation as follows.

Reflections from the aerial 25 designated by $\Gamma$, to which applies the following equation $$\Gamma = \frac{1 - (y_1 + y_2)}{1 + (y_1 + y_2)}$$

The phase angle of the reflected wave in relation to the phase angle of the received wave can be designated by $\phi$ to which applies the following equation $$\phi = 2 \text{ arc } tg \, y_{tot}$$

where $$y_{tot} = \frac{y_1 + y_2}{-j}$$

When setting $$y_1 + y_2 = -jk$$

The phase angle of the reflected wave in relation to the received wave $$\phi = 2 \text{ arc } tg \, k \text{ or}$$

$$\phi/2 = \text{arc } tg \, k$$

The values for k concerned in this example can be read along the ordinate axis from the curve according to FIG. 5.

For $k = -2,4$ is $\phi \approx -135°$, for $k = -0,4$ is $\phi \approx -45°$, for $k = +0,4$ is $\phi \approx +45°$ and for $k = +2,4$ is $\phi \approx 135°$. These values agree with the ordinate values indicated in the curve according to FIG. 21.

In order to determine the values of the components comprised in the circuits 41 and 42 (see FIG. 19), preferably two different capacitance values are chosen, which the capacitance diode 46 can assume at the two different values of the control voltage supplied to the control voltage input of the capacitance diode, which values are represented by the pulse train 133A (FIG. 17)

for the capacitance diode in the circuit 41 (FIG. 18) and the pulse train 133B, respectively, for the capacitance diode in the circuit 42 (FIG. 18).

The pulse train 133A is assumed to represent the control voltage zero in the interval between the pulses, and the control voltage 10 volt for each pulse. It is further assumed that the capacitance diode 46 in the circuit 41 assumes the susceptance value $jb_1=j0,5$ at the control voltage zero volt and the susceptance value $jb_1=j0,25$ at the control voltage 10 volt.

For the circuit 41 (FIG. 3) now the following equation system can be drafted:

$$\frac{1}{\frac{1}{b_1(0\ volt)} - x_2} + b_3 = b_{a(0\ volt)}$$

$$\frac{1}{\frac{1}{b_1(10\ volt)} - x_2} + b_3 = b_{a(10\ volt)} = -b_{a(0\ volt)}$$

In this equation system denote $b_1 = W \cdot C_{46}$ is the capacitance, which the capacitance diode 46 (FIG. 19) assumes at the control voltage values stated in parenthesis, and W is the angle frequency of the microwave signal received from the recording unit.

$X_2 = \omega L_{45}$ where $L_{45}$ is the inductance of the self-induction coil 45 (FIG. 19).

$b_3 = \omega C_{44}$ where $C_{44}$ is the capacitance of the capacitor 44 (FIG. 19).

ba = the susceptance of the whole circuit 41 at the different parenthetical control voltage values supplied to the control voltage input of the capacitance diode 46.

That ba (0 volt) = −ba (10 volt) is apparent from the curve $y_1$ in FIG. 20 where the susceptance of the circuit 41 is presupposed to be able to assume the values +1,4 and −1,4.

Disregarding the intermediate stage ba (10 volt) in the second equation, and at the addition of the two above equations, one obtains:

$$\frac{1}{\frac{1}{b_1(0\ volt)} - x_2} + \frac{1}{\frac{1}{b_1(10\ volt)} - x_2} + 2b_3 = 0$$

From this equation is obtained after development a second degree equation with respect to $x_2$, and this provides two solutions where $x_2$ is expressed in $b_3$. By inserting these solutions into one of the original equations two corresponding solutions of $b_3$ are obtained.

Of the two pairs of solutions thus obtained, one pair for the circuit, in which the capacitance diode 126D1 is included, i.e. for the circuit 41 in FIG. 18, reads:

$x_2 = 4,41$
$b_3 = 1,42$

A similar equation system can be set up for the circuit, in which the capacitance diode 126D2 is included, i.e. the circuit 42 in FIG. 3, in which case the ordinate values in the curve $y_2$ (FIG. 20) are taken as point of origin for determining the values of this circuit.

Also in this case two solutions are obtained, one of which is:

$x_2 = 4,31$
$b_3 = 1,83$

As in the case of devices according to previous embodiments, the receiver 23 is presupposed to be tuned to the frequency $f + k_1$ and, therefore, it will receive only the pulses of the reflected signal 130b. From the receiver 23 the detected pulses are conducted in the form of a pulse train 23p to an indication means 24, which may be a decoder known per se, which identifies the objects provided with the registration transmitters in question.

As appears from FIG. 22, the envelopes TE are formed by staircase-curves with only three steps. By increasing the number of circuits connected in parallel with each other similar to the circuits 41 and 42 in FIG. 18 and by feeding these circuits each with a pulse train of mutually different frequency and suitable amplitudes, a "staircase curve" with more steps can be obtained, which closer agrees with the envelope curve for $y_1 + y_2$ shown by dash-dotted lines on FIG. 20.

By such a device, a greater amplitude of the side band of the reflected signal detected in the receiver 23 in the recording unit illustrated in FIG. 17 can be obtained.

In practice, however, it was found that a device with only two circuits connected in parallel according to FIG. 18 is sufficient for obtaining a satisfactory result.

The invention described above in connection with the embodiments shown is not to be regarded restricted to these embodiments, but can be varied and modified within its scope defined in the claims.

We claim:

1. A device for registration of a first type of objects, here called registration objects, which move relative to a second type of objects, here called registration places, which registration objects, for example, may be vehicles, and the registration places may be places along a road section passed by the vehicles, which device comprises a plurality of recording units attached one in each registration place or on each registration object, and a plurality of registration transceivers attached one on each registration object or in each registration place, and each recording unit comprising an emitter (20), a receiver (23) and an indication unit (24), and each registration transceiver comprising (a) a frequency converter for converting a first signal received from said emitter to a second signal without adding new energy to the signal, which second signal is frequency shifted by a certain amount relative to the first signal, (b) a coding device to provide said second signal with a code individual for the registration transceiver and (c) an emitter device for emitting said second coded signal, said receiver of the recording unit being adapted to receive said second signal, and its indication unit being adapted to indicate said code, characterized in that said frequency converter comprises a modulator, which modulates the first signal in such a manner, that at least one sideband frequency component is formed, and that the coding device is adapted to provide the frequency component with said code individual for the registration transceiver, preferably by starting and stopping said modulator in accordance with a pattern constituting said code.

2. A device according to claim 1, characterized in that the frequency converter is a single side band modulator (26, 30–32).

3. A device according to claim 2, characterized in that the modulator is a phase modulator with a modulation circuit, which is passed by the received first signal and thereby changes its phase angle substantially n·360° according to a sawtooth-pattern where n is an integer number preferably equal to 1, so that the signal outgoing from the modulation circuit has a frequency of f+k or f−k where f is the frequency of the received first signal and k is proportional to the repetition frequency of said sawtooth-pattern.

4. A device according to claim 3, characterized in that the modulation circuit comprises a plurality of capacitance diodes (30D1,30D2) controlled by a sawtooth-shaped voltage.

5. A device according to claim 4, characterized in that said sawtooth-shaped voltage is generated by a generator (26a), which is put into and taken out of action by a pulse generator (27) generating pulses in accordance with said code individual for the registration transceiver.

6. A device according to claim 5, characterized in that the generator is a sawtooth-generator (26a).

7. A device according to claim 1, characterized in that it comprises a means which causes the first signal to divide into two components and to bring about a mutual phase difference of 90° between these components, and two networks or channels, which include means, for example, each a capacitance diode or varactor diode (30D1,30D2) adapted in dependency of an applied modulation voltage to effect a phase shifting of one of these components at a time by additional 180°, and means are provided to supply modulation voltage to said diodes in the form of one pulse train each (33A,33B), which consist of pulses and intervals of equal length, and means (33) to phase-shift one pulse train half a pulse length in relation to the other pulse train, and means to again combine the two signal components to one signal, the phase angle of which is turned through 90° for each of said phase shiftings, i.e. for each passage of a pulse edge in one or the other of the two pulse trains, and which implies that at least one side band with the frequency f+k has been formed, where k is a constant.

8. A device according to claim 1, characterized in that between the emitter of the recording unit and the frequency converter of the registration transmitter a hybrid (Hy) is coupled in, the four terminals of which form a first pair (Te1 and Te2) and a second pair (Te3 and Te4) of terminals, and to one terminal (Te1) in the first pair said first signal from the emitter (20) of the recording unit is conducted, and to each of the two terminals (Te3, Te4) in the second pair a capacitance diode (Di1, Di2) are connected, and a delay line (λ) is connected between one (Te4) of said terminals and one (Di2) of said diodes, and means are provided to supply said capacitance diodes (Di1, Di2) with control voltages to change their capacitance, and that said delay line and the control voltages of the diodes are so chosen, that the signals reflected from the diodes (Di1, Di2) include two side bands, which are returned to the hybrid and appear each on one of the terminals (Te1, Te2) in said first pair of terminals, and means are provided to utilize from one of these terminals (Te1, Te2) one of these side bands and to supply it to the receiver (23) in the recording unit.

9. A device according to claim 8, characterized in that the hybrid (Hy) is located between the aerial means (25) and the diodes (Di1, Di2) in the registration transceiver.

10. A device according to claim 8, characterized in that the hybrid (Hy) is located between the emitter (20) and the aerial means (22V,22H) in the recording unit.

11. A device according to claim 10, characterized in that the aerial means is of such a nature that a circular-polarized carrier wave is emitted to the registration transceiver, and the registration transmitter is adapted to generate two side bands, and the device further is so designed that these side bands are retransmitted toward the recording unit as circular-polarized carrier waves with mutually opposed rotation directions, and that the aerial of the recording unit is adapted to receive one of these carrier waves which then is utilized for registration purposes.

12. A device according to claim 8, characterized in that for each combination of aerials for emitting or receiving in polarization planes located 90° to each other a square waveguide funnel (50) is provided, which has taps (52,54) for signal input or signal output in two sides perpendicular to each other.

13. A device according to claim 8, characterized in that for each combination of aerials for emitting or receiving in polarization planes located 90° to each other a rectangular mat (60) is provided, which includes plates (61) coupled together in two directions perpendicular to each other, and taps (65,66) for signed input or output are provided on two sides of the mat forming a 90° angle with each other.

14. A device according to claim 1, where means are provided adapted in connection with the first signal being received by the registration transceiver and after conversion to said second signal being reflected to the recording unit to cause the signal to pass at least two phase turning circuits (41,42, FIG. 18), which may be connected in series or in parallel, and each of said circuits comprises an unlinear element, for example a capacitance diode (126D1,126D2) which in dependency of an applied varying modulation voltage (133A, 133B) shows a susceptance varying in a corresponding way, characterized in that means are provided to supply the unlinear elements (126D1,126D2) of said circuits with modulation voltages in the form of pulse trains, each forming substantially a square wave (133A, 133B), which pulse trains have mutually different frequencies and such amplitudes, selected in relation to the remaining components (44,47, FIG. 19) comprised in said circuits, that all circuits together cause a phase turning of the second signal reflected by the registration transmitter in relation to the phase angle of said first signal, which varies in steps from a starting position α to a second position which is α+360° and during said variation assumes several different values, which when they differ with mutually equal amounts and are plotted as ordinate values at mutually equal intervals from an abscissa representing a time axis, form points on a substantially straight line, and at repeated procedures of said events points arise on a sawtooth-curve with the repetition frequency $k_1$ so that a side band to the received signal is formed, the frequency of which is f+k where f is the frequency of the received signal and k is equal or proportional to $k_1$.

15. A device according to claim 14, characterized in that the circuits (41,42) connected in parallel with each other, in which capacitance diodes (126I and 126D2, respectively) are included, are two in number, and that the capacitance diode (126D1) of one of these circuits is supplied with a first pulse train (133A) with the frequency n, and the capacitance diode of the second circuit is supplied with a second pulse train (133B) of the frequency 2n, and that these pulse trains have such a phase position relative to each other, that each ascending and descending edge of the first pulse train substantially coincides with an ascending or descending edge in the second pulse train.

16. A device according to claim 15, characterized in that the amplitude of the first pulse train and the amplitude of the second pulse train are so related to each other and to the values of the components included in said phase turning circuits (41,42, FIG. 18), that the change in susceptance caused by the first pulse train (133A) in th first circuit (41) has a relation to the change in susceptance caused by the second pulse train (133B) in the second circuit (42) which substantially is equal to 1,4:1.

17. A device according to claim 14, characterized in that each phase turning circuit (41,42, FIG. 18) in addition to said capacitance diode (126D1 and 126D2, respectively) contains an inductance (45, FIG. 19) connected in series with the capacitance diode, and a capacitance (44, FIG. 19) connected in parallel with said series connection.

18. A device according to claim 14, characterized in that the first pulse train (133A) and the second pulse train (133B) have amplitudes of mutually equal size.

19. A device for registration of a first type of objects, here called registration objects, which are movable relative to a second type of objects, here called registration places, said registration objects being for example vehicles and said registration places being for example places along a road section passed by said vehicles, said device comprising in combination
   (a) a plurality of recording units located one in each registration places
   (b) each of said recording units comprising a transmitter (20) for transmitting a first signal of constant frequency,
   (c) a plurality of registration transceivers located one in each of said registration objects for receiving said first signal,
   (d) each of said transceivers comprising a frequency converter for converting said first signal to a second signal to provide for the transmission of said second signal without adding new energy to the signal, the frequency of said second signal being shifted by said converter by a certain amount relative to the frequency of said first signal, and
   (e) a coding device (32) in each transceiver for coding said second signal with a code individual to the transceiver,
   (f) and each recording unit further comprising a receiver (23) tuned to receive said second signal and an indication unit (24) for indicating said code when said second signal is received by the receiver, characterized by the fact that,
   (g) said frequency converter comprises a modulator, which stepwise and repeatedly alters the phase of said first signal through an angle of 360° whereby at least one side band is created, which forms said second signal.

20. A device according to claim 19, wherein said converter comprises a means which causes the first signal to divide into two components and to bring about a mutual phase difference of 90° between these components, and two networks or channels, which include means, for example each a capacitance diode or varactor diode (30D1, 30D2) adapted in dependency of an applied modulation voltage to effect a phase shifting of one of these components at a time by additional 180°, and means are provided to supply modulation voltage to said diodes in the form of one pulse train each (33A,33B), which consist of pulses and intervals of equal length, and means (33) to phase-shift one pulse train half a pulse length in relation to the other pulse train, and means to again combine the two signal components to one signal, the phase angle of which is turned through 90° for each of said phase shiftings, i.e. for each passage of a pulse edge in one or the other of the two pulse trains, and which implies that at least one side band with the frequency f+k has been formed, where k is a constant.

21. A device according to claim 19, wherein said converter comprises at least two phase shifting circuits (41,42, FIG. 18) said phase shifting circuit being arranged to be passed by said first signal, each of said circuits comprising an unlinear element, such as a varactor or capacitance diode (126D1, 126D2) which in dependency of an applied varying modulation voltage (133A,133B) shows a susceptance varying in a corresponding way, characterized in that means are provided to supply the unlinear elements (126D1, 126D2) of said circuits with modulation voltages in the form of pulse trains, each forming substantially a square wave (133A,133B), which pulse trains have mutually different frequencies and such amplitudes, selected in relation to the remaining components (44,47, FIG. 19) comprised in said circuits, that all circuits together cause a phase shifting of the second signal reflected or retransmitted by the registration transceiver, in relation to the phase angle of said first signal, which varies in steps from a starting position $\alpha$ to a second position which is $\alpha + 360°$ and during said variation assumes several different values, which when they differ with mutually equal amounts and are plotted as ordinate values at mutually equal intervals from an abscissa representing a time axis, form points on a substantially straight line, and at repeated procedures of said events, said straight lines together form a sawtooth curve with the repetition frequency $K_1$ whereby at least one side band to the first signal is formed, the frequency of which is $f+k$ where f is the frequency of the received signal and k is equal or proportional to $K_1$.

22. A system providing for the registration of a first type of objects, here called registration objects, which move relative to a second type of objects, here call registration places, which registration objects, for example, may be vehicles, and the registration places may be places along a road section passed by the vehicles, said system comprises a plurality of recording units attached one in each registration place or on each registration object, and a plurality of registration transceivers attached one on each registration object or in each registration place, each of said recording units having means for transmitting a carrier signal consisting of electromagnetical waves of a constant frequency, and each recording unit also comprising a receiver (23) and an indication unit (24), and each registration transceiver comprising a frequency converter for converting said carrier signal received from said recording unit to a second signal without adding new energy to the signal, which second signal is frequency shifted by a certain amount relative to the carrier signal, a coding device to provide said second signal with a code individual for the registration transceiver, and an emitter device for emitting said second coded signal, said receiver of the recording unit being adapted to receive said second signal, and its indication means being adapted to indicate said code, characterized in that said frequency converter comprises a modulator, which modulates the carrier signal in such a manner that at least one side frequency component is formed, which is greater than other side frequency components formed simultaneously and that the coding device is adapted to provide said one frequency component with said code individual to the registration transceiver, preferably by starting and stopping said modulator in accordance with a pattern constituting said code and that said receiver in the recording unit is adapted to receive said one frequency component and said indication unit is adapted to indicate the code carried by said one frequency component; said system also being provided with means for suppressing said other side frequency components that may be formed simultaneously.

23. A device for registration of a first type of objects, here called registration objects, which are movable relative to a second type of objects, here called registration places, said registration objects being for example vehicles and said registration places being for example places along a road section passed by said vehicles, said device comprising:
(a) a plurality of recording units located one in each registration place and
(b) each of said recording units comprising a transmitter (20) for transmitting a first signal of constant frequency,
(c) a plurality of registration transceivers located one in each of said registration objects for receiving said first signal,
(d) each of said transceivers comprising a frequency converter for converting said first signal to a second signal to provide for the transmission of said second signal without adding new energy to the signal, the frequency of said second signal being shifted by said converter by a certain amount relative to the frequency of said first signal,
(e) a coding device (32) in each transceiver for coding said second signal with a code individual to the transceiver,
(f) said frequency converter comprises a modulator, which stepwise and repeatedly alters the phase of said first signal through an angle of 360° whereby a number of sidebands is created,
(g) means for utilizing only one of said sidebands as said second signal and providing it with said code,
(h) means in said recording units for receiving and decoding said one of said sidebands.

24. A radio communication system providing for the registration of a first type of objects, here called registration objects, which are movable relative to a second type of objects, here called registration places, and registration objects being for example vehicles and said registration places being for example places along a road section passed by said vehicles, said system comprising a recording unit located at each of said registration places and having means for transmitting a carrier signal of constant pre-selected frequency, and a transceiver located in each of said registration objects for receiving said carrier signal and including (a) a coding device for supplying a coded modulation signal containing a code that identifies the transceiver in which it is supplied and (b) a single sideband modulator for modulating said carrier signal upon its reception with said modulation signal to provide a single sideband signal containing said code and having at least one side frequency component, the frequency of said side frequency component being predetermined and differing from the frequency of said carrier signal, said transceiver further comprising means for emitting said single sideband signal for transmission to said recording unit, said recording unit further comprising a receiver tuned to receive said side frequency component and a unit providing an indication of said code when said side frequency component is received by said receiver.

25. The system defined in claim 24 wherein said modulator comprising means for recurrently shifting the phase of said first signal in a stepwise manner through an angle of 360°.

26. A system providing for the registration of a first type of objects, here called registration objects, which are movable relative to a second type of objects, here called registration places, said registration objects being for example vehicles and said registration places being for example places along a road section passed by said vehicles, said system comprising a recording unit located in each of said registration places and having a transmitter for transmitting a first signal of constant frequency, and a registration transceiver located in each of said registration objects for receiving said first signal and comprising (a) a frequency converter for converting said first signal to a second signal without adding new energy to the second signal and (b) an antenna for emitting said second signal for transmission to said recording unit, the frequency of said second signal being shifted by said converter by a certain amount relative to the frequency of said first signal, a coding device in said transceiver for providing said second signal with a code individual to the transceiver, said recording unit further comprising a receiver tuned to receive said second signal and an indication unit for indicating said code when said second signal is received by said receiver, characterized by the fact that said frequency converter comprises a modulator, which stepwise and repeatedly alters the phase of said first signal through an angle of 360° whereby at least one sideband is created, which forms said second signal, said modulator comprising a hybrid (Hy), said hybrid having four terminals of which one (Te1) is connected to the antenna of the registration transceiver to receive the first signal from the transmitter of the recording unit and transmit the second, modulated signal back to the receiver of the recording unit and a second terminal (Te2) of said hybrid (Hy) being connected to ground through an energy dissipating resistor (Da) for absorbing the energy of signals of a frequency which are not utilized for the information transmission, while a third terminal (Te3) of said hybrid is connected to ground through a first varactor diode (Di1), the control electrode of said first varactor diode being connected to a source of a pulse train consisting of substantially rectangular pulses, intermixed with periods of the same length as the pulses, and the fourth terminal (Te4) of said hybrid being connected to ground through a second varactor diode (Di2), the control voltage terminal (Dst2) of said second diode being connected to a source of a pulse train consisting of pulses similar to those supplied to the control voltage terminal of said first varactor diode (Di1) but phase shifted 90° in relation to the latter, a first matching circuit (An1) connected between said first diode (Di1) and said third terminal (Te3), a second matching circuit (An2) connected between said second diode (Di2) and said fourth terminal (Te4), said first and second circuits (An1, An2) being effective to match the impedance of the hybrid to that of the diodes, and a delay line providing a connection between one of said diodes and said hybrid in series with said one of said diodes for phase shifting the signal through that connection by the amount of 45°.

27. A system providing two-way radio communication between a first station and at least one additional station wherein one of said first and additional stations is movable relative to the other of said first and additional stations, said system comprising an interrogation unit located at said first station and having means for transmitting a carrier signal of fixed pre-selected frequency, a transmitter-receiver unit at said additional station for receiving said carrier signal and comprising means for supplying an encoding signal and a single sideband modulator for intermittently phase modulating the received carrier signal with said encoding signal to produce at least one intermittent side frequency component in a pattern that constitutes a code for identifying said transmitter-receiver unit, said one side frequency component having a frequency that is predetermined and different from the frequency of said carrier signal, said transmitter-receiver unit further comprising means for effecting the transmission of at least said side frequency component, and said interrogation unit comprising a receiver tuned to receive said side frequency component and means for decoding the received side frequency component to recover said code.

28. The system defined in claim 27 wherein said modulator phase modulates said first signal and comprises means for recurrently shifting the phase of said first signal in a stepwise fashion through an angle of 360°.

29. A system providing two-way radio communication between a first station and at least one additional station wherein one of said first and additional stations is movable relative to the other of said first and additional stations, said system comprising an interrogation unit located at said first station and having means for transmitting a carrier signal of constant pre-selected frequency, a transmitter-receiver unit at said additional station for receiving said carrier signal and comprising means for phase modulating said carrier signal upon its reception with an encoding signal to produce at least one side frequency component in the form of a coded signal that contains a code for identifying the transmitter-receiver unit, the frequency of said side frequency component being predetermined and different from the frequency of said carrier signal, said transmitter-receiver unit further comprising means for effecting the transmission of at least said coded signal, and said interrogation unit comprising receiver means tuned to receive said coded signal and means for decoding the received coded signal to recover said code.

30. The system defined in claim 29 wherein said transmitter-receiver unit comprises aerial means for receiving said carrier signal upon transmission thereof from said interrogation unit and means for conducting said carrier signal from said aerial means to said modulating means without any bandpass filtering.

31. A system providing two-way radio communication between first and second stations wherein one of said stations is moveable relative to the other, said system comprising an interrogation unit located at said first station and having means for transmitting a carrier signal of constant pre-selected frequency, a transmitter-receiver unit located at said second station for receiving said carrier signal and having means for re-transmitting said carrier signal without adding energy thereto to thus provide for the transmission of said carrier signal from the transmitter-receiver unit, said transmitter-receiver unit further including means for modulating said carrier signal with a modulating signal containing a code to provide for the transmission of said code from the transmitter-receiver unit, and said interrogation unit having receiver means for receiving the thusly modulated carrier signal and for recovering said modulating signal, and means for retrieving said code from the recovered modulating signal, said modulating means comprising a phase modulator that is responsive to said modulating signal for generating at least one side frequency component containing said code and having a predetermined frequency that is different from the frequency of said carrier signal, and said receiver means of said interrogation unit being tuned to the frequency of said side frequency component.

* * * * *